(12) United States Patent
Miyamoto

(10) Patent No.: US 8,477,347 B2
(45) Date of Patent: Jul. 2, 2013

(54) METHOD AND SYSTEM FOR MANAGING USER SETUP INFORMATION

(75) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 12/628,056

(22) Filed: Nov. 30, 2009

(65) Prior Publication Data
US 2010/0141987 A1 Jun. 10, 2010

(30) Foreign Application Priority Data
Dec. 2, 2008 (JP) ................................. 2008-307584

(51) Int. Cl.
*G06F 3/12* (2006.01)
(52) U.S. Cl.
USPC ......................................................... 358/1.15

(58) Field of Classification Search
USPC ......................................................... 358/1.15
See application file for complete search history.

(56) References Cited

U.S. PATENT DOCUMENTS
2009/0297838 A1* 12/2009 Knapp ........................... 428/336

FOREIGN PATENT DOCUMENTS
JP 7-230367 A 8/1995

* cited by examiner

*Primary Examiner* — Eric A Rust
(74) *Attorney, Agent, or Firm* — Canon U.S.A., Inc. IP Division

(57) ABSTRACT

A user setup information management system including an information processing apparatus and an image forming apparatus connected, wherein user setup information is managed by automatically deleting user setup information when the user setup information no longer is needed.

9 Claims, 10 Drawing Sheets

FIG.5

| PRINTER | PrinterA |
| --- | --- |
| PRINTER LOGIN ID | 1000 |
| PRINTER PASSWORD | **** |
| BUTTON NAME | TRANSMIT TO PC-A |
| TRANSMISSION DESTINATION FOLDER | AA |

OK  CANCEL

FIG.6

| METHOD OF DELETION | ● DELETE SETUP WHEN DEVICE ICON IS DELETED |
| | ○ DELETE SETUP WHEN DEVICE ICON IS DELETED AND THEN A NEW DEVICE ICON IS REGISTERED |
| | ○ DELETE SETUP WHEN DEVICE ICON IS DELETED AND THEN THE PC IS SHUT DOWN NEXT TIME |
| | ☐ CONFIRM WHETHER TO DELETE SETUP WHEN DELETION IS NOTIFIED |

[ OK ]  [ CANCEL ]

FIG.8

| BUTTON DATA | |
|---|---|
| BUTTON ID | 001 |
| USER ID | 1000 |
| BUTTON NAME | TRANSMIT TO PC-A |
| TRANSMISSION TARGET DEVICE | 111.111.111.111 |
| TRANSMISSION DESTINATION FOLDER | AA |

METHOD AND SYSTEM FOR MANAGING USER SETUP INFORMATION

BACKGROUND OF THE INVENTION

1. Field of the Invention

The present invention relates to a method for managing user setup information by automatically deleting setup information registered in an external device such as a multifunction peripheral connected to an information processing apparatus via a network when the setup information becomes unnecessary. The present invention also relates to a system for managing user setup information.

2. Description of the Related Art

In recent years, a copying machine (a multifunction peripheral) which has copying, printing, facsimile transmission, and e-mail transmission functions enabled a user to register a macro for executing a frequently used setup and a series of processing, as a button. Thus, a user can perform processing simply by pressing a button registered on a user interface of the copying machine (multifunction peripheral). Such configuration eliminates the need of performing time-consuming setup each time, and allows the user to perform a desired operation with a simple operation.

Generally, a copying machine (multifunction peripheral) is often shared in a company. When personal relocation or seating change is made in an office, personal computer (PC) arrangement is also changed in some cases. In this case, a favorite copying machine may become distant from a user and accordingly the user may reset a user's PC environment to use a nearby copying machine instead of the previous copying machine.

Although the user deletes a setup of the previous copying machine (for example, registration as a printer) from a user's PC, the user seldom deletes unnecessary information such as button data registered in the previous copying machine. As a result, pieces of unnecessary button data remain in the previous copying machine.

There is a method for detecting and deleting data which becomes no longer necessary in this way. This method deletes the data according to priority of a deletion condition when there is no more available capacity (refer to, for example, Japanese Patent Application Laid-Open No. 7-230367). Japanese Patent Application Laid-Open No. 7-230367 discusses a printing device which overlays printing data onto form data. Japanese Patent Application Laid-Open No. 7-230367 describes a technique for deleting the form data according to the priority of the deletion condition when available capacity of a hard disk for storing the form data decreases.

With the conventional technique, the form data and other data can be automatically deleted but a setup cannot, or data is deleted together with a relevant setup. Further, since the printing device automatically deletes data based on available capacity, a storage period, and frequency of use, a setup necessary for the user may be deleted in mistake. Conversely, an unnecessary setup may remain in the device.

SUMMARY OF THE INVENTION

The present invention is directed to efficiently deleting user setup information such as a macro button and a transmission button which is set and stored in an image forming apparatus (a multifunction peripheral) when the information becomes no longer necessary for a user.

According to an aspect of the present invention, a user setup information management system includes an information processing apparatus and an image forming apparatus. The information processing apparatus includes a notification-of-deletion transmission unit configured to transmit a notification of deletion which includes user information to the image forming apparatus when a user deletes device setup information of the image forming apparatus. The image forming apparatus includes a function execution unit configured to execute a function of the image forming apparatus based on user setup information, a setup storage unit configured to store the user setup information in association with the user information, a notification-of-deletion receiving unit configured to receive the notification of deletion from the information processing apparatus, a searching unit configured to search for the user setup information associated with the user information included in the notification of deletion received by the notification-of-deletion receiving unit, from the user setup information stored in the setup storage unit, and a deletion unit configured to delete the user setup information associated with the user information included in the notification of deletion as a result of the search by the searching unit.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an exemplary user interface for registering a setup to an external device of the document management system according to the exemplary embodiment of the present invention.

FIG. 6 illustrates an exemplary user interface for setting a method for notifying deletion by the document management system according to the exemplary embodiment of the present invention.

FIG. 8 illustrates an example of contents of button data stored in the button registration management system according to the exemplary embodiment of the present invention.

DESCRIPTION OF THE EMBODIMENTS

Various exemplary embodiments, features, and aspects of the invention will be described in detail below with reference to the drawings.

Figure 1:
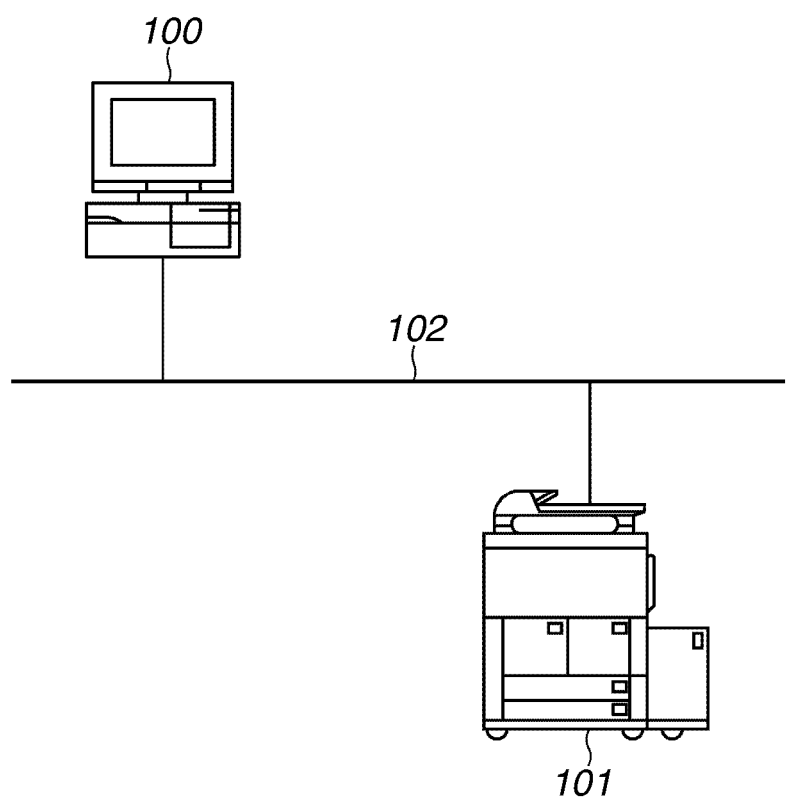
FIG. 1 illustrates an exemplary configuration of a user setup information management system according to an exemplary embodiment of the present invention.

FIG. 1 illustrates an exemplary configuration of a user setup information management system to which the present invention can be applied. An information processing apparatus 100 can execute various programs such as application programs. A document management system of the present invention is arranged in the information processing apparatus 100. The information processing apparatus 100 is connected to a network 102 such as Ethernet. The information processing apparatus 100, via the network 102, transmits document data to an image forming apparatus via a printer or facsimile driver which converts the document data to job data (printing data) that can be translated by the image forming apparatus to perform printing and facsimile transmission. Further, the information processing apparatus 100 can change a setup of the image forming apparatus by using an application for changing a setup stored in the image forming apparatus. A setup includes a transmission setup, a macro, and other user setups. An image forming apparatus 101, a multifunction peripheral, is connected to the network 102 via a network interface. The information processing apparatus 100 analyzes job data received from a client computer, converts the job data to an image, and performs printing and facsimile transmission.

Figure 2:
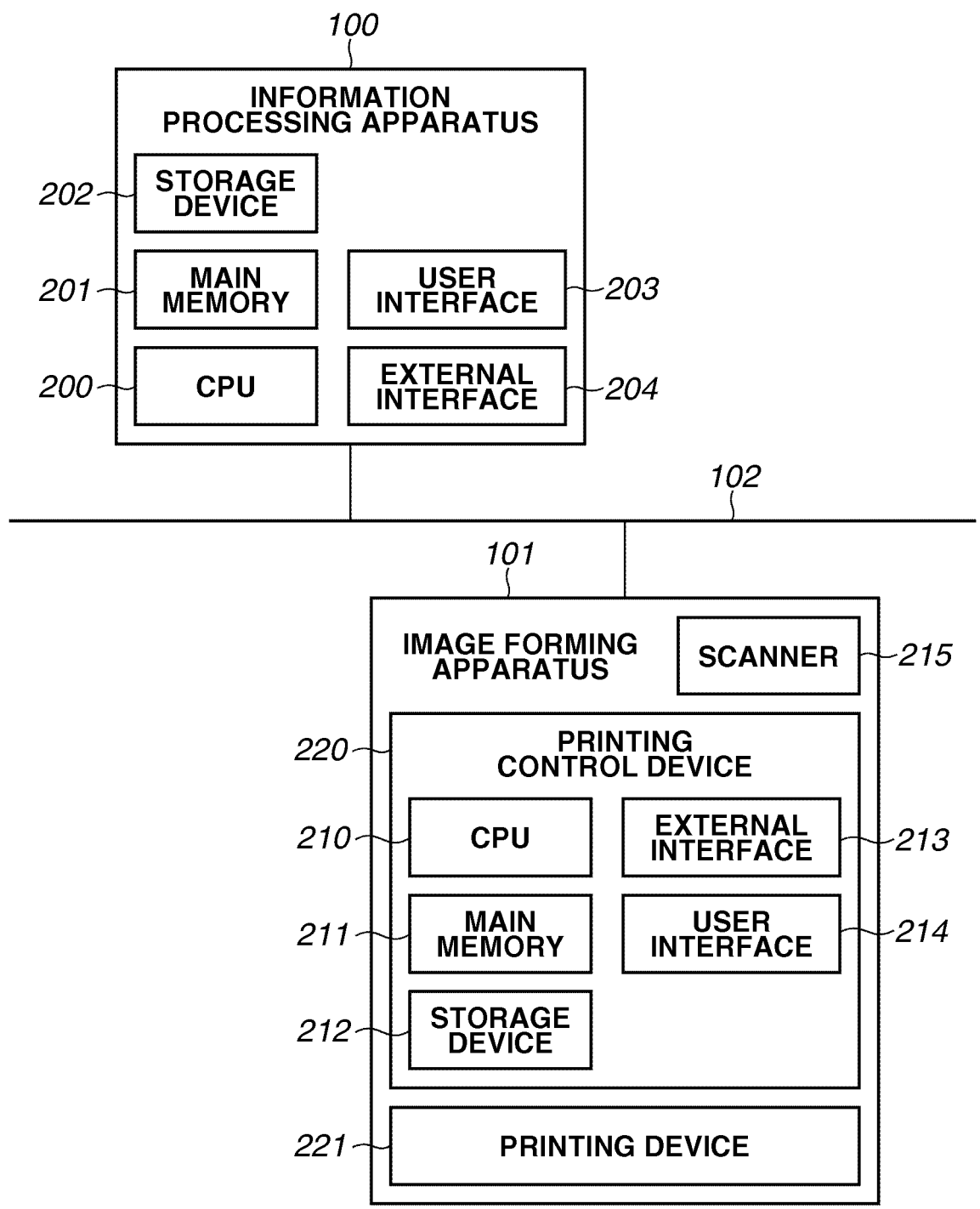
FIG. 2 illustrates an exemplary hardware configuration of the user setup information management system according to the exemplary embodiment of the present invention.

FIG. 2 illustrates an exemplary hardware configuration of the user setup information management system to which the present invention can be applied.

The hardware configuration of the information processing apparatus 100 illustrated in FIG. 2 is equivalent to a hardware configuration of common information processing apparatuses. The hardware configuration of common information processing apparatuses such as a general personal computer and a server computer is applicable to the information processing apparatus according to the present exemplary embodiment.

Referring to FIG. 2, a central processing unit (CPU) 200 of the information processing apparatus 100 loads a program such as an operating system (hereinafter referred to as OS) and an application from a storage device 202 into a main memory 201 and then executes the program. The OS operates on a computer. Processing of each flow chart described below is realized by executing the program.

The main memory 201 serves as a main memory and a work area for the CPU 200.

A user interface 203 controls inputs from a keyboard (not illustrated) and a pointing device such as a mouse (not illustrated) as well as display on a display unit.

An external interface 204 controls data access among a hard disk (HD) and floppy disk (FD) for storing various data which are connected by a universal serial bus (USB), and controls communication with other devices connected to the network.

An image forming apparatus 102 is a digital multifunction peripheral to which the present invention can be applied.

The image forming apparatus 102 includes a printing control device 220, a printing device 221, and a scanner 215. The scanner 215 scans a paper document and converts the scanned data to image data. In addition to a copy function, the scanner 215 can be used to realize various functions involving scanning of a paper document, such as facsimile and e-mail transmission, file transfer by a server message block (SMB) or a file transfer protocol (FTP), and data storage in BOX (a memory area).

The printing control device 220 includes a CPU 210, a main memory 211, a storage device 212, an external interface 213, and a user interface 214.

The CPU 210 loads various control programs from the storage device 212 into the main memory 201 and then executes these programs.

The main memory 211 serves as a main memory and a work area for the CPU 210.

The storage device 212 is used by various control programs to store a setup made by these control programs and image data for printing.

The external interface 213 controls data access to a memory which is connected by an USB and controls communication with other devices connected to the network.

The user interface 214 controls inputs from the keyboard or a touch panel and display on a panel display.

The CPU 210 loads an image processing program into the main memory 201 and then executes the program to generate image data. Then, the printing device 221 performs a series of image forming processes such as paper handling, image transfer, and fixing for the generated image data to form an image on a recording medium such as recording paper. It is also possible to optically read an image on a document set on the scanner 215, convert it to digital image information, and input the digital image information to the printing control device 220.

Figure 3:
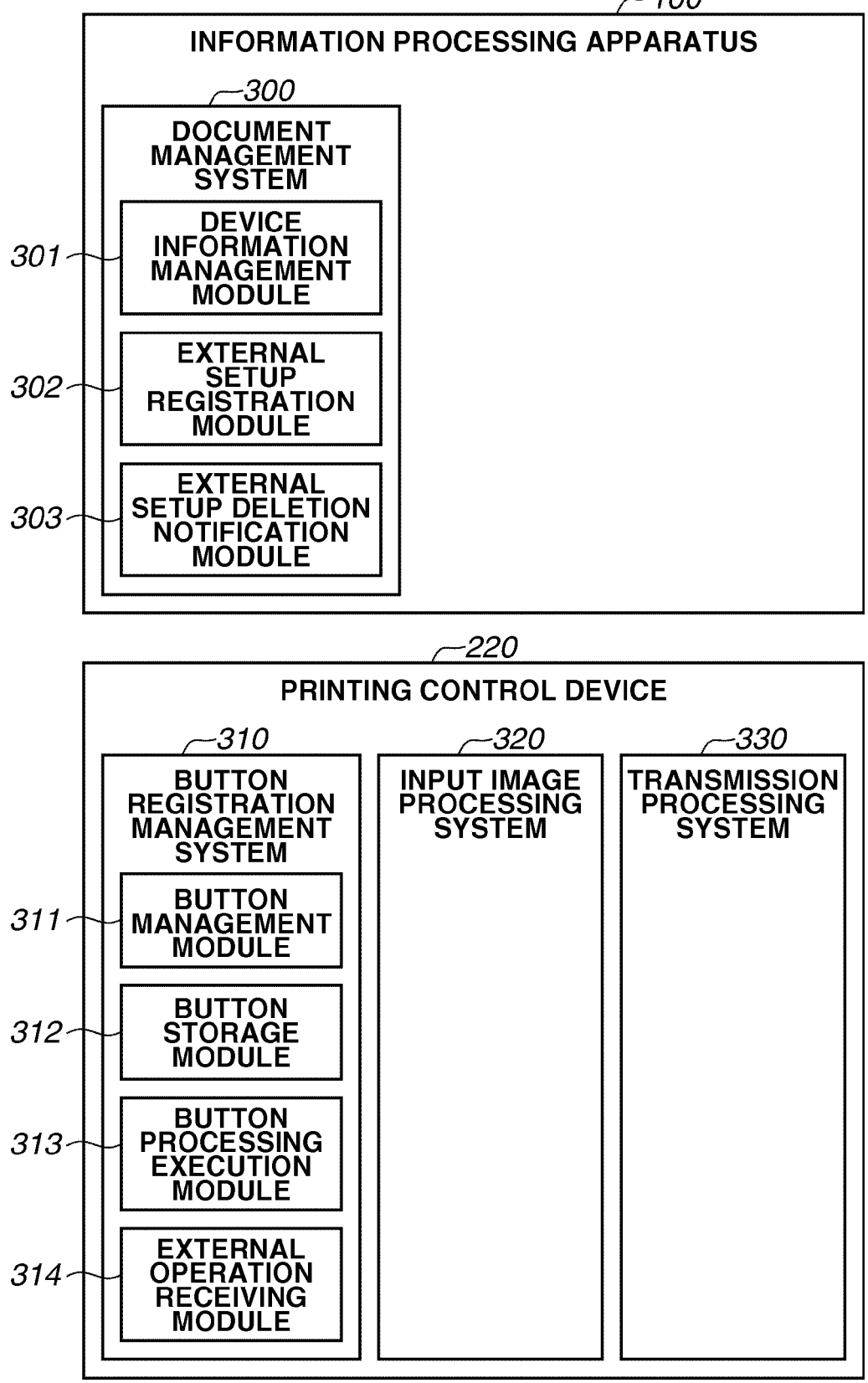
FIG. 3 illustrates an exemplary software configuration of the user setup information management system according to the exemplary embodiment of the present invention.

FIG. 3 illustrates an exemplary software configuration of the user setup information management system to which the present invention can be applied. FIG. 3 also illustrates a software configuration of a button registration management system 310, an input image processing system 320, and a transmission processing system 330 included in the printing control device 220. The software configuration of the printing control device 220 will be described later.

A document management system 300 is stored in the storage device 202 of the information processing apparatus 100. The CPU 200 loads the document management system 300 into the main memory 201 and then executes it.

The document management system 300 includes a device information management module 301, an external setup registration module 302, and an external setup deletion notification module 303.

Figure 4:
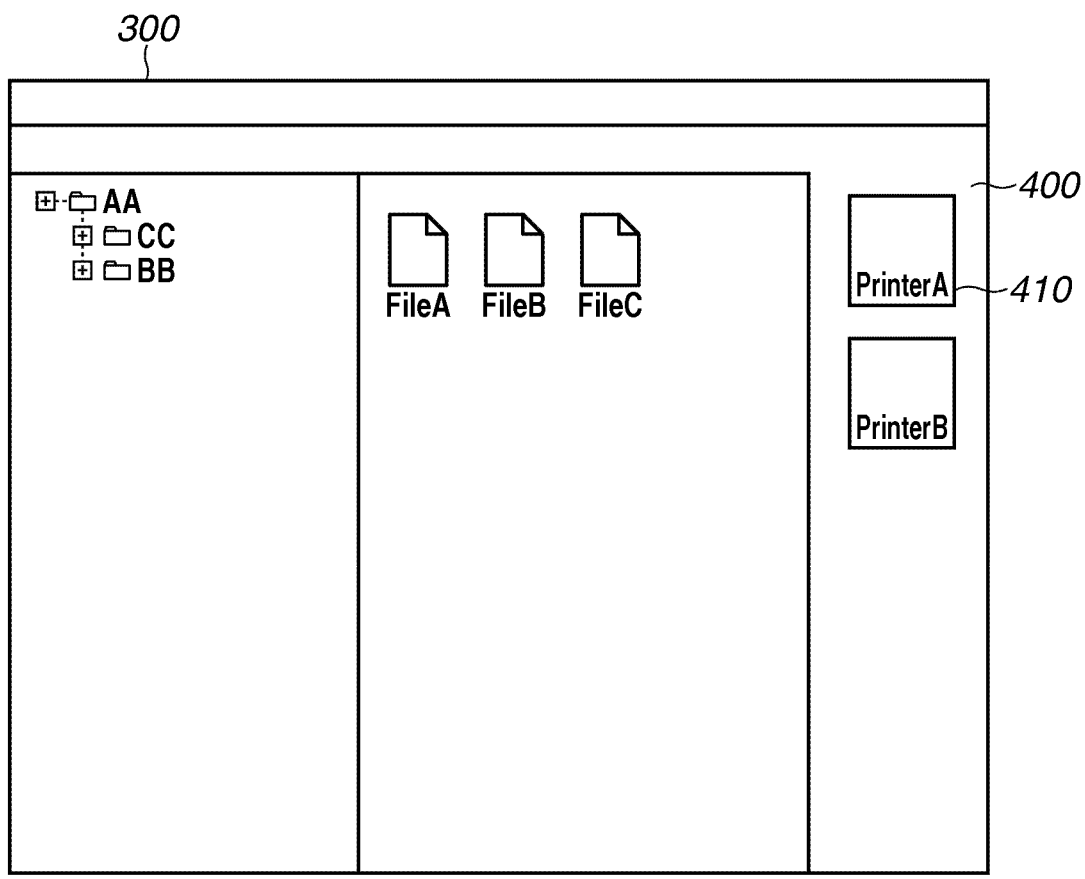
FIG. 4 illustrates an exemplary user interface of a document management system according to the exemplary embodiment of the present invention.

FIG. 4 illustrates an exemplary user interface of the document management system to which the present invention can be applied.

The device information management module 301 has a function for providing a user interface for requesting an external device such as the image forming apparatus 101 connected to the information processing apparatus 100 via the network 102 to perform certain processing. External devices registered by the external information management module 301 are displayed in an external device display area 400. The external device display area 400 displays each of registered external devices as a device icon 410 side by side. A user can request a target external device to perform processing by clicking a device icon associated with the target device or moving a target file onto the device icon through drag-and-drop operation.

The external setup registration module 302 has a function for registering a setup in an external device such as the image forming apparatus 101 connected to the information processing apparatus 100 via the network 102.

FIG. 5 illustrates an exemplary user interface for registering a setup to an external device of the document management system to which the present invention can be applied.

The external setup registration module 302 transmits a setup input via the user interface of FIG. 5 to the image forming apparatus 101 via the network 102. Registration information includes a name of a printer subjected to setup registration, a user identification (ID) for logging in to the printer, a password associated with the user ID, a name of a button to be registered, and processing to be registered to the button.

Processing to be registered to the button, for example, is to transmit an image scanned by the image forming apparatus 101 to the information processing apparatus 100 which completed setup registration. Therefore, the user interface of FIG. 5 allows the user to set a transmission destination folder. Although not illustrated, it may be possible to add an input field for specifying a transmission protocol (FTP, SMB, or e-mail).

Upon reception of the registration information, the image forming apparatus 101 receives relevant data via the external interface 213 and transfers the data to the button registration management system 310 of the printing control device 220. Upon reception of the data, the button registration management system 310 analyzes the received data via the external operation receiving module 314. Then, the button management module 311 stores the setup information in the button storage module 312. The user ID, the button name, the transmission destination folder, and the transmission protocol of the received data are stored in the setup information.

The external setup deletion notification module 303 has a function for requesting an external device to delete a setup which is registered thereby. More specifically, when a registration of an external device in the device information management module 301 is deleted, the external setup deletion notification module 303 instructs the external device which is associated with the deleted setup to delete a relevant setup. Upon reception of a notification of deletion from the external setup deletion notification module 303, the button registration management system 310 analyzes the contents of the notification of deletion via the external operation receiving module 314. Then, the external operation receiving module 314 transfers the received data to the button management module 311, analyzes that the received data is a notification of deletion, and deletes the relevant setup. The received data includes a user ID. The button management module 311 searches for a button in which the user ID included in the received data is registered from the button data stored in the button storage module 312. If the same user ID is found in any button, the button management module 311 deletes the button.

Although deleting registration of an external device is described as an example of an operation for transmitting a notification of deletion, other operations may be used as a step for transmitting the notification of deletion.

For example, when a printer setup registered in the OS is deleted, a notification of deletion may be transmitted to the printer with which registration was deleted. In a document management system capable of referencing scan image data stored in a memory area (BOX function) of a copying machine, for example, when a registered reference setup is deleted, a notification of deletion may be transmitted.

The external setup deletion notification module 303 can set processing related to a notification of deletion.

FIG. 6 illustrates an exemplary user interface for setting a method for notifying of deletion of a setup by the document management system to which the present invention can be applied.

The user interface allows a user to set timing for transmitting a notification of deletion to an external device and specify whether the user confirms deletion of the external device setup before transmitting the notification of deletion.

A notification of deletion is transmitted to an external device, for example, at the following timings:
When a device icon is deleted
When a device icon is deleted and then a new device icon is registered
When a device icon is deleted and then the OS is shut down next time This setup is provided to prevent an external device setup from being deleted if a device icon is temporarily deleted when the user updates the device icon. Timings for transmitting a notification of deletion is not limited to the above, but other methods may be used, for example, a method for setting a time period till deletion.

It is also possible to display a user interface for confirming whether or not the user will delete a setup at the time of deletion to prevent the user from deleting a necessary setup. When a device icon is deleted, not only icon display but also a user setup is deleted. The user setup refers to macro button settings and transmission button settings.

The button registration management system 310 includes the button management module 311, the button storage module 312, a button processing execution module 313, and the external operation receiving module 314.

The button registration management system 310 is stored in the storage device 212 of the printing control device 220. The CPU 210 loads the button registration management system 310 into the main memory 211 and then executes it.

Figure 7:
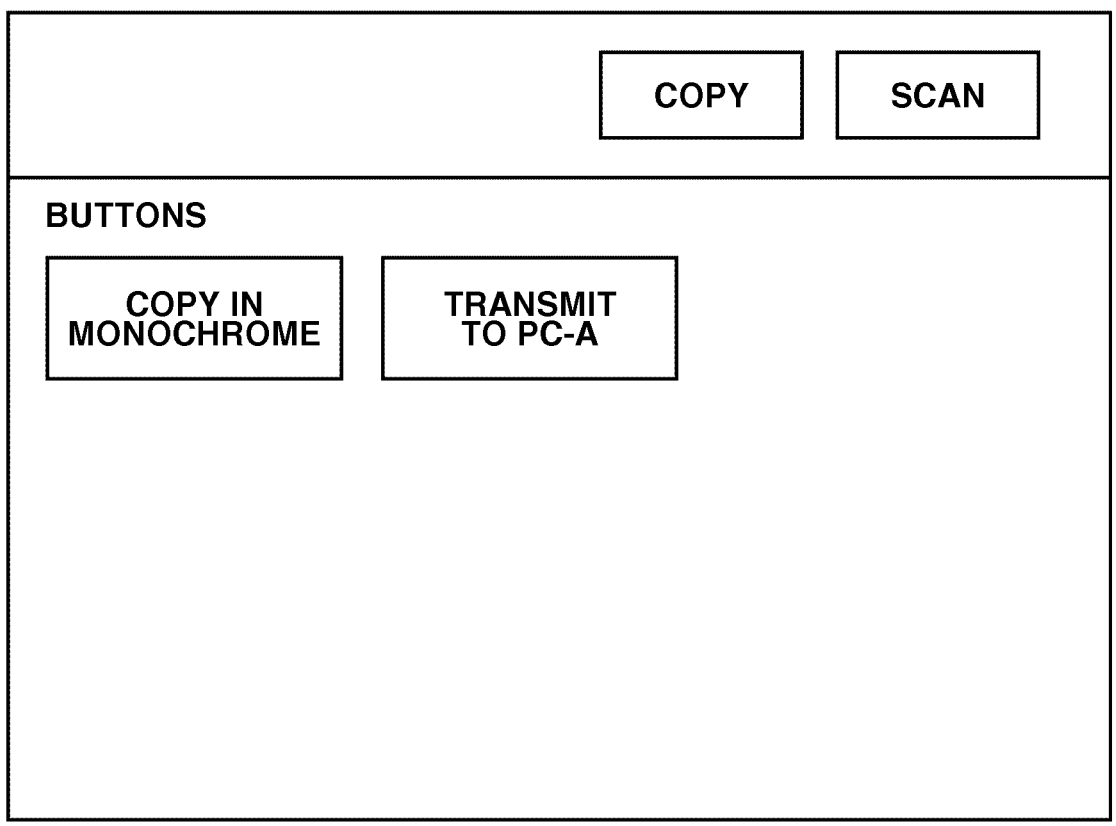
FIG. 7 illustrates an exemplary user interface of a button registration management system according to the exemplary embodiment of the present invention.

FIG. 7 illustrates an exemplary user interface of the button registration management system to which the present invention can be applied.

The interface is displayed when the button management module 311 of the button registration management system 310 reads button data stored in the storage device 212 by the button storage module 312. The button data read from the button storage module 312 is displayed on the panel display of the user interface 214. FIG. 7 illustrates a state where two buttons, namely a "Copy in monochrome" button and a "Transmit to PC-A" button, are registered and displayed. The setup information about the "Transmit to PC-A" button is set from the user interface of FIG. 5.

The button management module 311 manages button data of registered buttons, for example, addition, deletion, and change of the button.

The button storage module 312 loads button data which is requested by an acquisition request from the button management module 311 from the storage device 212 into the main memory 211, and stores button data which is requested by a setup request in the storage device 212.

FIG. 8 illustrates exemplary button data stored in the button registration management system to which the present invention can be applied.

FIG. 8 illustrates button data describing processing for transmitting an image scanned by the image forming apparatus to the information processing apparatus.

The button ID is used to uniquely identify button data. A universal unique identifier (UUID) is a typical ID to be used.

The user ID is an ID of a user who registered the button. Upon a deletion request, the user ID is used to search for a target setup to be deleted.

The button name is the name of the button. The button name is displayed on the user interface to allow the user to easily understand the function of the button. However, the button name can be arbitrarily set by the user.

The transmission target device and the transmission destination folder denote a destination of the scanned image.

The transmission target device is assigned a network address (IP address) of a target device of transmission. The transmission destination folder denotes a folder path on the transmission target device. The button data may include the transmission protocol (FTP, SMB, or e-mail) as specified data.

These pieces of information are used to determine a transmission target information processing apparatus and the transmission destination folder. The button data which is set for other than transmission processing does not include the transmission target device and the transmission destination folder but include setup items necessary to perform relevant processing. The example of FIG. 7 displays the "Copy in monochrome" button. In this case, the button data includes monochrome specification and copy processing setting instead of the transmission target device and the transmission destination folder button settings.

When the user presses a button on the user interface, the button processing execution module 313 analyzes the button data of the pressed button and requests a system capable of performing relevant processing to perform the processing described in the button data. For example, it is assumed that the button data includes description of transmission of an image scanned by the image forming apparatus to a folder AA of an information processing apparatus A. In this case, the button processing execution module 313 requests the transmission processing system 330 to scan an image and transmit the scanned image to the folder AA of the information processing apparatus A having a network address 111.111.111.111. Upon reception of the request, the transmission processing system 330 requests the input image processing system 320 to scan an image and transmits the generated scanned image to the folder AA of the information processing apparatus A via the external interface.

The external operation receiving module 314 receives a request to change the contents of registered button data from the information processing apparatus which is connected to the image forming apparatus via the network. When the external operation receiving module 314 receives a notification of deletion from the document management system, the button management module 311 processes its contents.

Figure 9:
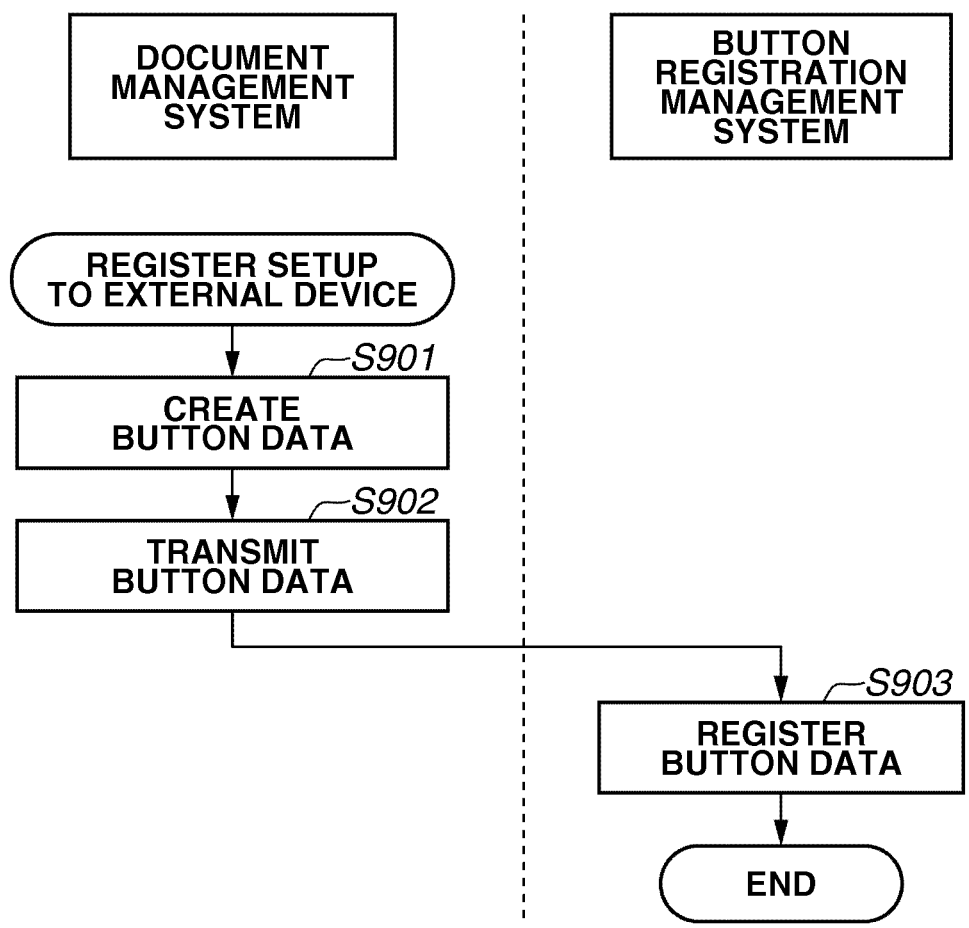
FIG. 9 is a flow chart illustrating exemplary setup/registration processing for an external device of the user setup information management system according to the exemplary embodiment of the present invention.

FIG. 9 is a flow chart illustrating an exemplary setup/registration processing to an external device of the user setup information management system to which the present invention can be applied.

The external setup registration module 302 of the document management system 300 starts the setup/registration processing upon reception of a setup/registration request from the user via the user interface 203. The setup/registration request includes an address of an external device, a user ID, the button name, the transmission target device, and the transmission destination folder.

The CPU 200 loads the document management system 300 from the storage device 202 into the main memory 201 and then executes it.

First, upon reception of a setup/registration request from the user, in step S901, the external setup registration module 302 creates button data based on input information. In step S902, the external setup registration module 302 transmits the created button data to the address of the external device included in the setup/registration request.

Upon reception of the setup/registration request, the image forming apparatus transmits the button data to the external operation receiving module 314 of the button registration management system 310 via the external interface 213. The CPU 210 loads the button registration management system 310 from the storage device 212 into the main memory 211 and then executes it.

Upon reception of the setup/registration request from the document management system 300, the external operation receiving module 314 requests the button management module 311 to register the received button data. Upon reception of the request, in step S903, the button management module 311 requests the button storage module 312 to store the received button data for registration.

The processing for registering the button data in the image forming apparatus can be performed by entering a setup item by using the user interface of the image forming apparatus.

Figure 10:
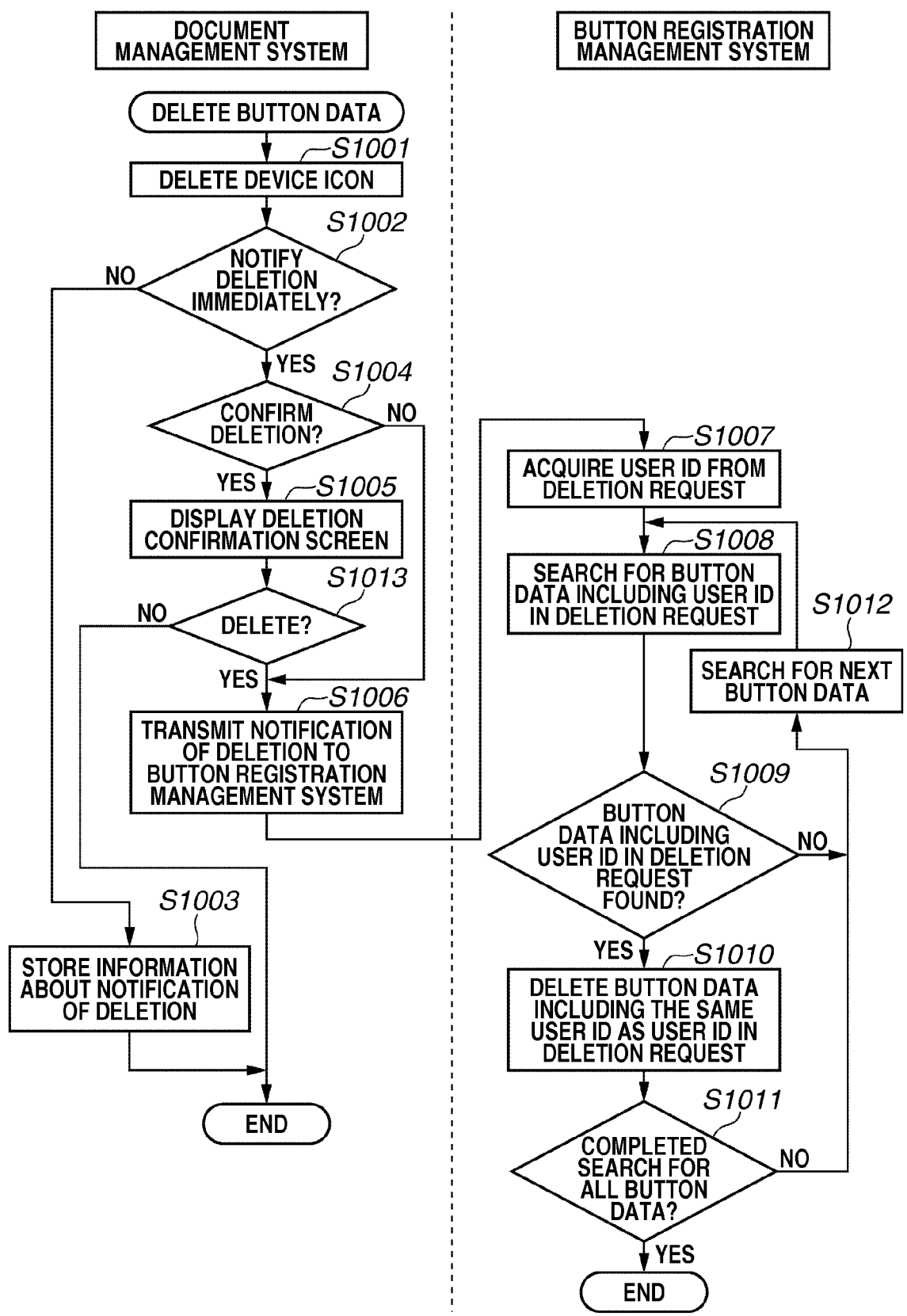
FIG. 10 is a flow chart illustrating exemplary processing for deleting an external device setup by the user setup information management system according to the exemplary embodiment of the present invention.

FIG. 10 is a flow chart illustrating exemplary processing for deleting an external device setup by the user setup information management system to which the present invention can be applied.

The document management system 300 starts the deletion processing upon reception of a request to delete the device icon 410 of the document management system from the user via the user interface 203. The CPU 200 loads the document management system 300 from the storage device 202 into the main memory 201 and then executes it.

First, upon reception of the request to delete the device icon 410 from the user, in step S1001, the device information management module 301 deletes information about the requested device icon from the storage device 202. Then, in step S1002, the device information management module 301 checks whether it is set by the method for notifying of deletion that a notification of deletion is to be transmitted to the external device immediately after deleting the device icon. If the notification of deletion is not to be transmitted to the external device immediately after deleting the device icon (NO in step S1002), the processing proceeds to step S1003. In step S1003, the device information management module 301 only stores the information about the notification of deletion but does not transmit the notification of deletion when the device icon is deleted. When a specified timing of deletion comes, the device information management module 301 references the stored information about the notification of deletion and transmits the notification of deletion to the relevant external device.

If the notification of deletion is to be transmitted to the external device immediately after deleting the device icon (YES in step S1002), in step S1004, the device information management module 301 checks whether it is set that deletion of button data is to be confirmed by the user. If deletion of button data is to be confirmed by the user (YES in step S1004), then in step S1005, the device information management module 301 displays a message for notifying the user of deletion of button data on the display of the user interface 203. Then in step S1013, when the user enters an instruction not to delete the button data on the confirmation screen (NO in step S1013), the device information management module 301 terminates processing without transmitting the notification of deletion to the external device.

When the user enters an instruction to delete the button data on the confirmation screen (YES in step S1013), the device information management module 301 requests the external setup deletion notification module 303 to transmit the notification of deletion. Upon reception of the request to transmit the notification of deletion, in step S1006, the external setup deletion notification module 303 transmits via the external interface 213 the notification of deletion to an image forming apparatus associated with the deleted device icon. The notification of deletion includes a user ID.

The notification of deletion is transmitted from the document management system to the external operation receiving module 314 of the button registration management system 310 via the external interface 213 of the image forming apparatus. Upon reception of the notification of deletion, the external operation receiving module 314 transfers the notification of deletion to the button management module 311. Upon reception of the notification of deletion, in step S1007, the button management module 311 acquires the user ID from the notification of deletion. In steps S1008 and S1009, the button management module 311 searches for button data which includes the same user ID as the one acquired from the notification of deletion. If there is the button data which includes the same user ID as the one acquired from the notification of deletion (YES in step S1009), in steps S1010, the button management module 311 requests the button storage module 312 to delete the button data. Then, the button storage module 312 deletes the relevant button data. If button data does not include the same user ID as the one acquired from the notification of deletion (NO in step S1009), the button data is not deleted. In steps S1011 and S1012, the button registration management system 310 performs this processing for all pieces of the button data.

When the user deletes a device icon using the above described processing, the button data registered by the user in the image forming apparatus in association with the deleted device icon based on determination that the device is no longer used.

A method for setting and deleting an external device setup has been described based on exemplary button data in which a frequently used setup and a series of processing can be registered. However, in addition to button data, any information that can be registered in an external device can be used. For example, the method is also applicable to an address book for facsimile transmission. If a user ID of a user who registers the address book is registered at the time of address registration, the address book can be deleted in a similar way. Further, procedures for deleting an external device setup according to the present invention is also applicable to scanned image data stored in the image forming apparatus and to a mail transfer setup of the scanned image data.

Further, by including a deletion type in a notification of deletion at the time of transmission thereof in step S1006, it is possible to delete only a certain type of data among pieces of setup data which includes the same user ID as the one included in the notification of deletion. For example, when only button data is designated in the deletion type, button data that includes the same user ID as the one included in the notification of deletion is deleted. Further, when facsimile address is designated in the deletion type, only a certain setup such as an address of a facsimile which includes the same user ID as the one included in the notification of deletion can be deleted.

The method and system for managing user setup information according to the present invention are executed by using document management software and dedicated software for MFP management which are executed on a user's information processing apparatus (PC). Screens (display units) of these pieces of software store device setup information of an image forming apparatus (MFP), such as a printer icon and a BOX storage icon frequently used by the user. According to the present invention, when the user deletes these device icons (buttons) from the user's PC, the above described software transmits a notification of deletion to the image forming apparatus together with user information such as user's login information. The notification of deletion notifies the user that information about the use of the image forming apparatus has been deleted from the user's PC. Since login information uses directory services such as active directory, login information (user information) about a user who uses the MFP and the PC is shared therewith. Although the above described notification of deletion is transmitted by the document management software and the MFP management software executed on the PC, it may be transmitted by a service executed on the OS. When the notification is transmitted by a service on the OS, the notification of deletion may be transmitted after detecting that a printer deletion operation is performed from the OS. The printer deletion operation from the OS is, for example, deletion of a printer in a printer list in Control Panel of Windows (a registered trademark).

Further, when the user deletes a frequently used printer icon from the user's PC, information specific to the printer associated with the printer icon, such as a network name and network address thereof, is also deleted from the user's PC. A printer driver (dynamic link library (DLL) file) specific to the printer may or may not be deleted together with the deleted icon.

On the side of the image forming apparatus (MFP), an operation unit (display unit) displays icons (buttons) for executing such functions as transmission and BOX storage as user icons. These icons are used to perform MFP functions such as transmission and BOX storage with a user-specific setup when the user logs in to the MFP. For the transmission icon, for example, a transmission destination mail address and a transmission destination folder path registered by the user are set and stored in the image forming apparatus as user setup information.

When the image forming apparatus receives a notification of deletion from the information processing apparatus, the notification of deletion includes user information such as login information of the user who deleted a device icon.

Further, the user can perform a transmission setup for a transmission button to be registered in the MFP from the user's PC. In this case, the user inputs information about transmission setup, such as a button name, a destination address (a mail address, a transmission destination folder path), and a transmission protocol (mail, FTP, and SMB) from the screen of the document management software on the user's PC. When these settings are input, user setup information is generated and then transmitted to the MFP. Based on the received user setup information, the MFP registers the transmission setup as a transmission button for the user. This completes the description of an operation for registering a transmission button to the MFP from the user's PC.

An example directly showing features of the present invention will be described below. In this example, a user deletes information about a printing function of the MFP from the user's PC (information processing apparatus). More specifically, the user deletes a printer icon or a printer driver from a list. According to the deletion operation, a notification of deletion including user information (user ID) about the user who performed the deletion operation is transmitted to the MFP which includes a deleted printer name or a network address. Upon reception of the notification of deletion, the MFP searches for registration of a transmission function setup corresponding to the received user information in the notification of deletion, from stored setups. If user setup information (transmission setup) corresponding to the user information (user ID) is found, the MFP deletes the user setup information (transmission setup). Therefore, the transmission button (icon) for the user displayed on the display unit is also deleted.

More specifically, when the user deletes an unnecessary printer icon on the user's PC, a notification of deletion is transmitted to the MFP. Upon reception of the notification of deletion, the MFP deletes not only the icon but also the transmission setup of the user from the user information.

Conventionally, a user setup remains undeleted in the MFP until the user who registered it intentionally deletes it or an administrator performs periodical maintenance.

Regarding an MFP no longer used by the user, the user may delete the icon and printer driver from the user's PC for the printer function. However, there has been a problem that a transmission setup registered by the user in the MFP remains undeleted therein.

According to the present invention, it is possible to automatically delete a transmission setup which becomes no longer necessary although such an unused transmission setup has conventionally remained undeleted in the MFP.

Further, the present invention can be implemented, for example, as a system, an apparatus, a method, a program, or a storage medium. More specifically, the present invention may be applied to both a system including a plurality of devices and an apparatus composed of one device.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-307584 filed Dec. 2, 2008, which is hereby incorporated by reference herein in its entirety.

What is claimed is:

1. A user setup information management system including an information processing apparatus and an image forming apparatus, the user setup information management system comprising:
    the information processing apparatus comprising:
    a notification-of-deletion transmission unit configured to transmit a notification of deletion including user information to the image forming apparatus when a user deletes device setup information of the image forming apparatus; and
    the image forming apparatus comprising:
    a function execution unit configured to execute a function of the image forming apparatus based on user setup information;
    a setup storage unit configured to store the user setup information in association with the user information;
    a notification-of-deletion receiving unit configured to receive the notification of deletion from the information processing apparatus;
    a searching unit configured to search for the user setup information associated with the user information included in the notification of deletion received by the notification-of-deletion receiving unit, from the user setup information stored in the setup storage unit; and
    a deletion unit configured to delete the user setup information associated with the user information included in the notification of deletion as a result of the search by the searching unit.

2. The user setup information management system according to claim 1, wherein the device setup information is a printer driver of the image forming apparatus registered in the information processing apparatus.

3. The user setup information management system according to claim 1, wherein the information processing apparatus displays the device setup information as a device icon associated with the image forming apparatus on a display unit of the information processing apparatus and the notification-of-deletion transmission unit transmits the notification of deletion when the user deletes the device icon.

4. The user setup information management system according to claim 1, wherein the information processing apparatus further comprises:
    a user setup information generation unit configured to generate the user setup information in response to a user request;
    a user setup information transmission unit configured to transmit the user setup information, and
    wherein the image forming apparatus further comprises a registration unit configured to receive the user setup information register the user setup information in the setup storage unit, and
    wherein the user setup information includes the user information of the user who made a request to the user setup information generation unit.

5. A method for managing user setup information related to an information processing apparatus and an image forming apparatus connected to each other, the method comprising:
    a method for controlling the information processing apparatus comprising:
    transmitting a notification of deletion including user information to the image forming apparatus when a user deletes device setup information of the image forming apparatus; and
    a method for controlling the image forming apparatus comprising:
    executing a function of the image forming apparatus based on user setup information;
    storing the user setup information in association with the user information;
    receiving a notification of deletion from the information processing apparatus;
    searching for the user setup information associated with the user information included in the received notification of deletion, from the stored user setup information; and
    deleting the user setup information associated with the user information included in the notification of deletion as a result of the search.

6. The method according to claim 5, wherein the device setup information is a printer driver of the image forming apparatus registered in the information processing apparatus.

7. The method according to claim 5, wherein the method for controlling the information processing apparatus further comprises:
    displaying the device setup information as a device icon associated with the image forming apparatus on a display unit of the information processing apparatus; and
    transmitting the notification of deletion when the user deletes the device icon.

8. The method according to claim 5, wherein the method for controlling the information processing apparatus further comprises:

generating the user setup information for performing the function of the image forming apparatus in response to a user request;
transmitting the user setup information, and
wherein the method for controlling the image forming apparatus further comprises:
receiving the user setup information from the information processing apparatus and registering the user setup information in a setup storage unit, and
wherein the generated user setup information includes the user information about the user who made a request.

9. A non-transitory computer-readable storage medium storing a program for instructing a computer to perform the method according to claim 5.

* * * * *